Patented Nov. 6, 1928.

1,690,335

UNITED STATES PATENT OFFICE.

CARLETON ELLIS, OF MONTCLAIR, NEW JERSEY.

SULPHUR PRODUCT AND PROCESS OF MAKING SAME.

No Drawing.   Application filed April 7, 1925. Serial No. 21,425.

This invention relates to sulphur products and to a process of making same and relates especially to such products containing a modifying agent incorporated with the sulphur which renders the latter capable of wider uses in the arts.

The modifying agent which I employ is one which dissolves in sulphur in suitable proportions or is capable of being dispersed in molten sulphur or being miscible with hot sulphur, to modify the melting point, and to substantially prevent or greatly retard crystallization and so forth.

Preferably I employ a fixed or non-volatile oil or solid substance preferably non-crystalline, desirably a resinous body, as the modifying agent.

In my copending applications, Serial Nos. 609,133, and 12,360 (filed Dec. 26, 1922 and Feb. 28, 1925 respectively) I have called attention to the property of various sulphurized bodies, some of a generally resinous character, in modifying the texture, strength and other qualities of sulphur; describing especially resins made by treating phenol with sulphur monochloride.

In the present invention in certain phases thereof I prefer to use, in the preparation of the modifying agent, instead of phenol itself various phenolic or phenoloid bodies capable of reacting with sulphur or reagents containing sulphur such as sulphur chloride. The various grades of cresylic acid and coal tar acids containing some phenol or preferably the more inexpensive grades from which phenol has been removed are suitable for carrying out the present invention.

In commerce there are several grades of coal tar acids called crude cresylic acids but which contain some of the xylenols. For example a grade, one-half of which distills below 207° C. contains perhaps 30 per cent orthocresol, 20 per cent metacresol and 15 per cent paracresol; the balance of the tar acid content probably being made up almost entirely of the lowest boiling xylenol. On distillation of another grade of so-called crude cresylic acid or tar acid about 50 per cent will pass over at a temperature ranging up to 212° C., this grade containing probably 30 to 40 per cent of cresol (largely as meta and paracresol) the balance being xylenols in varying proportions.

If the latter grade (which more correctly should be termed crude cresols and xylenols rather than crude cresylic acids), is treated with its own weight of sulphur chloride a resin is formed which is employed to advantage in the preferred embodiment of the present invention.

The resin may be made by adding sulphur monochloride to an equal amount of the tar acid, with stirring, the reagent preferably being added slowly as the reaction is violent. A diluent such as benzol or toluol may be present, for example an amount equal in volume to the tar acid. This allows the reaction to take place somewhat more smoothly. Hydrochloric acid is given off and this may be absorbed and recovered. The resinous material made with or without diluent usually has a disagreeable odor and should be deodorized and well-neutralized for best results.

One feature of the invention involves using the modified sulphur with other materials for making various articles where any decided "chemical" or tarry odor would be objectionable and where any hydrochloric acid might be destructive or otherwise objectionable.

A simple means of deodorizing is that of blowing air or steam through the resin at a temperature of about 150° C. This may be carried out if desired in vacuo in a manner similar to that employed in the deodorizing of cottonseed oil.

In any event it will be found that it is possible to very materially deodorize the resin by such blowing treatment and at the same time hydrochloric acid is usually removed completely or sufficiently so that no special neutralizing reagent is required. The use of such reagent however is not precluded. The proportion of sulphur chloride to the tar acid may be varied but by using equal weights of the two reacting substances a resin is obtained which is readily miscible or bendable with molten sulphur and has a surprising effect in modifying the melting point and other characteristics of the sulphur.

If a considerably larger proportion of sulphur chloride is employed the miscibility is not so satisfactory, while if lower proportions are used there is likely to be some intermediate products formed which are not as efficient. However as stated I may vary the proportion of the sulphur monochloride as desired and such variation oftentimes is a needful consideration when treating products as variable in composition as tar acid distillates.

The use of sulphur dichloride or mixtures of sulphur monochloride or dichloride or sulphuryl chloride and other substances capable of yielding sulphurized products useful for the present purpose is not precluded.

The resin or other modifying agent may be added to the sulphur in a molten state, for example by heating the sulphur to 130–140° C., adding the modifying material and stirring to create a proper blend or solution or dispersion. The sulphur and its modifying agent may however be mixed in any other suitable manner.

*Example 1*—100 parts by weight of sulphur monochloride was slowly added to a mixture of 150 parts of toluol and 100 parts of tar acids of which 50 per cent boiled above 212° C. During the addition of the sulphur chloride the reaction mixture was stirred constantly. The solvent was then removed by distillation and steam was blown into the resin while the latter was heated on an oil bath at 140–150° C. A clear hard resin was obtained with a melting point of 91.5° C. according to the ball and ring method. The resin was melted together with sulphur in the proportion of one part of the former to three parts by weight of the latter. The composition on cooling was uniform, did not separate nor crystallize. By the ball and ring method the melting point was found to be 105° C. Thus the melting point of sulphur was reduced approximately 15 degrees by incorporation with the resin.

The resinated sulphur prepared in this manner from 3 parts of sulphur and 1 part of sulphurized cresol and xylenol resin may be admixed with asbestos fibre, china clay, powdered mica and similar fillers or with wood flour, cedar dust or chips, and the like to make compositions which can be molded on hot pressing. In such cases it is desirable to have the melting point as high as is consistent with avoidance of crystallization. As a rule 10 per cent of the resin on the weight of the sulphur is the minimum for this prescribed condition, this gives a product of higher melting point than that with 25 per cent of resin.

Using equal parts of sulphur and the resin prepared according to the above example the melting point falls considerably, products having a melting or softening point as low as 65° C. having been obtained. This melting point is lower than the melting points of the sulphur or resin.

In the preferred form the product comprises a major proportion of sulphur and a minor proportion of a sulphurized homologue-of-phenol resin. Preferably the sulphurized homologue-of-phenol is present in substantially a minor proportion. Sulphur is cheaper than the resin and the maximum amount of the former which can be used to meet the requirements of the particular usage in hand is preferably employed. On the other hand for making low melting products or those in which a major proportion of resin is desired for special purposes the product may contain sulphur in minor proportion.

Thus products comprising sulphur and a substance miscible with molten sulphur and lowering the melting point thereof may be obtained over a considerable range; from products having melting point slightly below suphur to those melting at many degrees below the melting point of sulphur.

Another form of the invention is a product comprising sulphur and an organic substance compatible (miscible) therewith containing chemically-combined sulphur. In some cases the employment of a deodorized sulphur resin is desirable, as the crude resin might deteriorate the flavor of materials with which it comes into contact or proximity.

In the foregoing I have employed as my specific illustration the sulphurized cresol or sulphurized xylenol resins or mixtures of these but it should be understood that I may use the other substances such as sulphurized terpenes, sulphurized naphthalene, sulphurized cymene, sulphurized resorcin and the like or other bodies sulphurized or unsulphurized in so far as they function in the same manner.

Sulphur in its various forms, crude or refined, flowers of sulphur and other forms of sulphur may be employed in accordance with the present invention.

The present case is in part a continuation of Serial No. 609,133 and also contains matter disclosed in my copending cases 428,852, filed Dec. 7, 1920 and 482,172 filed July 2, 1921 (compositions containing free sulphur or plastic sulphur and resins made from phenolic bodies and sulphur chloride.)

What I claim is :—

1. A product comprising sulphur and sulphurized xylenol resin.

2. A product comprising approximately three parts of sulphur to one part of sulphurized cresol and xylenol resin.

3. A product comprising sulphur and cresol-xylenol sulphur chloride-resin.

4. The process which comprises reacting on raw material comprising cresol and xylenol with approximately an equal weight of sulphur chloride to form a resin, deodorizing and incorporating with molten sulphur.

5. The process which comprises reacting on raw material comprising cresol and xylenol with sulphur chloride to form a resin, deodorizing and incorporating with molten sulphur.

6. A product comprising sulphur and a cresol and xylenol resin which is miscible therewith when in a molten state.

7. A product comprising sulphur and a minor proportion of a sulphurized xylenol resin.

CARLETON ELLIS.